US007578380B2

(12) United States Patent
Brinkmeier et al.

(10) Patent No.: US 7,578,380 B2
(45) Date of Patent: *Aug. 25, 2009

(54) ROLLER TABLE ROLL, PARTICULARLY FOR CONVEYING FURNACE-HEAT

(75) Inventors: Peter Brinkmeier, Langenfeld (DE); Dankfried Klempel, Mülheim (DE)

(73) Assignee: SMS Siemag Aktiengesellschaft, Duesseldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/505,227

(22) Filed: Aug. 16, 2006

(65) Prior Publication Data

US 2006/0275728 A1 Dec. 7, 2006

Related U.S. Application Data

(63) Continuation of application No. 10/480,717, filed as application No. PCT/EP02/05954 on May 31, 2002, now abandoned.

(30) Foreign Application Priority Data

Jun. 15, 2001 (DE) ................................ 101 28 999

(51) Int. Cl.
*B65G 13/00* (2006.01)
*F27D 3/00* (2006.01)

(52) U.S. Cl. ............................ 193/37; 492/21; 492/39; 492/42; 432/236; 432/246

(58) Field of Classification Search .................. 193/37; 492/21, 39, 42; 432/236, 246
See application file for complete search history.

(56) References Cited

U.S. PATENT DOCUMENTS 3,900,913 A * 8/1975 Drumm ........................ 15/179
4,181,217 A * 1/1980 Huls et al. .................. 198/842
4,235,002 A * 11/1980 Pav et al. ....................... 492/46
4,299,018 A * 11/1981 Bickerstaff et al. ........... 492/45
5,151,737 A * 9/1992 Johnson et al. ............. 399/117
5,362,230 A * 11/1994 Facco .......................... 432/236
5,421,724 A * 6/1995 Facco .......................... 432/236

* cited by examiner

*Primary Examiner*—Mark A Deuble
(74) *Attorney, Agent, or Firm*—Andrew Wilford

(57) ABSTRACT

A roller conveyor roll for the transport of furnace-heated metallic strip or a continuously cast steel strand has a shaft extending along an axis, a tubular shell coaxially surrounding the roller shaft and having a pair of axially spaced ends, and a respective insulating body at each of the shell ends between the respective shell and the shaft and angularly fixed to the shell and to the shaft for transmitting torque between the shaft and the shell ends. The bodies electrically and thermally insulate the shell from the shaft.

3 Claims, 4 Drawing Sheets

ROLLER TABLE ROLL, PARTICULARLY FOR CONVEYING FURNACE-HEAT

CROSS REFERENCE TO RELATED APPLICATION

This application is a continuation of application Ser. No. 10/480,717 filed 11 Dec. 2003 (now abandoned) as a national stage of PCT/EP02/05954 filed 31 May 2002 and based upon German national application 10128999.5 of 15 Jun. 2001 under the International Convention.

FIELD OF THE INVENTION

The invention relates to a roller-conveyor roller, especially for the transport of furnace-heated metallic strip material, continuous castings of steel or the like, with a roller shaft and a roller shell casing secured to the roller shaft at least at the roller ends.

BACKGROUND OF THE INVENTION

Because of a general difference in the electrical potentials between a metallic product and a roller-conveyor roll, electrical currents and spark formation can result in surface defects in the manufactured material.

It is known (DE 24 26 135 C2) to provide a roller conveyor roll for the transport of rolled products such as rolling mill products which can resist impact with the rolled product. It has not been noted therein that such roller conveyor rolls also contribute to electrical currents and spark formation which can degrade the rolled product.

OBJECT OF THE INVENTION

The invention has therefore as its object to suppress such electrical currents and spark formation so that the mentioned damage no longer can arise.

SUMMARY OF THE INVENTION

The object set forth is achieved according to the invention in that the roller shell or casing is electrically and/or thermally insulated at the respective roller ends, at least, where it is mounted on the roller shaft. Such a roller conveyor roll is suitable for roller conveyors or roller conveyor segments in regions of inductive heating and induced electrical fields as well as wherever general differences in electrical potentials between a rolled product or continuously-cast product and a roller conveyor roll can arise and wherever electrical currents and spark formation can contribute to surface defects. Advantageously, such a roller-conveyor roll can also be used to largely suppress the heat transfer by conduction between the roller casing or shell heated by a product and the roller shaft or roller axle which as a rule is cooled.

A further feature of the invention is that between the roller casing at the roller ends and the roller shaft, individual insulating bodies are distributed around the respective peripheries or a one-piece annular insulating body is provided. The insulating bodies can thus serve to center the roller casing on the roller shaft and/or for torque transmission therebetween.

In a feature of the invention the individual insulating bodies distributed around the periphery are comprised of profile rods. The profile can be round rods, flat or rectangular cross sections or can be composed of other cross sectional shapes. The material for such profiled bars can be of ceramic or other insulating materials of corresponding strength.

A further advantage arises when the profile bars are axially secured with respect to the roller shaft and the roller casing together with mounting rings.

To restrict axial shifting it is, for example, advantageous for the axial securing to be achieved with sheet metal rings welded onto the ends of the mounting rings.

While the roller casing and the roller shaft are basically separate from one another and are connected together exclusively by means of the insulated bodies, by means of the axial retainers, a loose mount and a fixed mount can be formed between the roller casing and the roller shaft. As a result, thermal stresses can be compensated and thermal expansion and contraction can be accommodated.

Basically a further advantage is achieved in that the insulating bodies can center the roller shell on the roller shaft and simultaneously form a torque transmitting medium. In this manner a compact unit which is advantageous for any requisite force transmission in a roller conveyor roll is obtained.

In an alternative embodiment, the roller shell or casing is subdivided into roller shell segments arranged in the roller shaft and mounted on the roller shaft by insulated bodies which serve to center them on the roller shaft and transmit torque between the roller shaft and the roller-shell segments. The insulating bodies are distributed around the periphery of the roller shaft. In this manner the roller shell or casing segments are separated from the roller shaft and are exclusively connected through the described insulating bodies.

According to a further alternative, the insulating body is a cone-shaped inner ring and/or a cone-shaped outer ring and/or conical rollers that form the insulating bodies. Because of the short roller casing segments the longitudinal expansion and contraction and the expansion and contraction resulting from heating in the axial direction has play which is negligible so that no arrangement of loose mount and fixed mount is required. In this manner electrical currents in the axial direction are especially suppressed.

A further feature of the invention is that any increased play in the mutual fitting of the insulating bodies and their retaining portions resulting from heating of the roller casing can be compensated by the fact that the conically shaped inner ring is axially shiftable and is adjustable against a spring force on the roller shaft.

The inclination of the cone angle is then so selected that because of the longitudinal expansion of the roller casing or shell the outer cone assumes a different position upon the inner cone and thereby largely compensates for the expansion of the diameter.

In a practical embodiment the conically shaped inner ring is biased on the roller shaft by means of dished-disk springs which can be seated against a step or shoulder on the stuff and against the hollow conical outer ring which is fixedly connected to the roll casing or shell and which is shiftable axially with respect to the roller shaft. The play is continuously eliminated by the spring force.

Another configuration provides that a roller shell segment is mounted at the respective roller ends in respective conical mounts and generally centrally by means of insulating bodies distributed over the periphery.

BRIEF DESCRIPTION OF THE DRAWING

In the drawing embodiments of the invention are shown and are described in greater detail in the following. In the drawing.

SPECIFIC DESCRIPTION

Figure 1A:
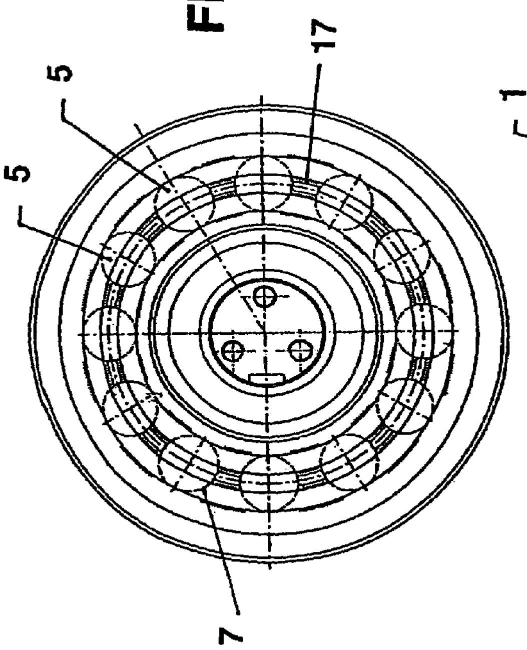
FIG. 1 is an axial longitudinal section through a first embodiment of the roller conveyor roll.
Figure 1:
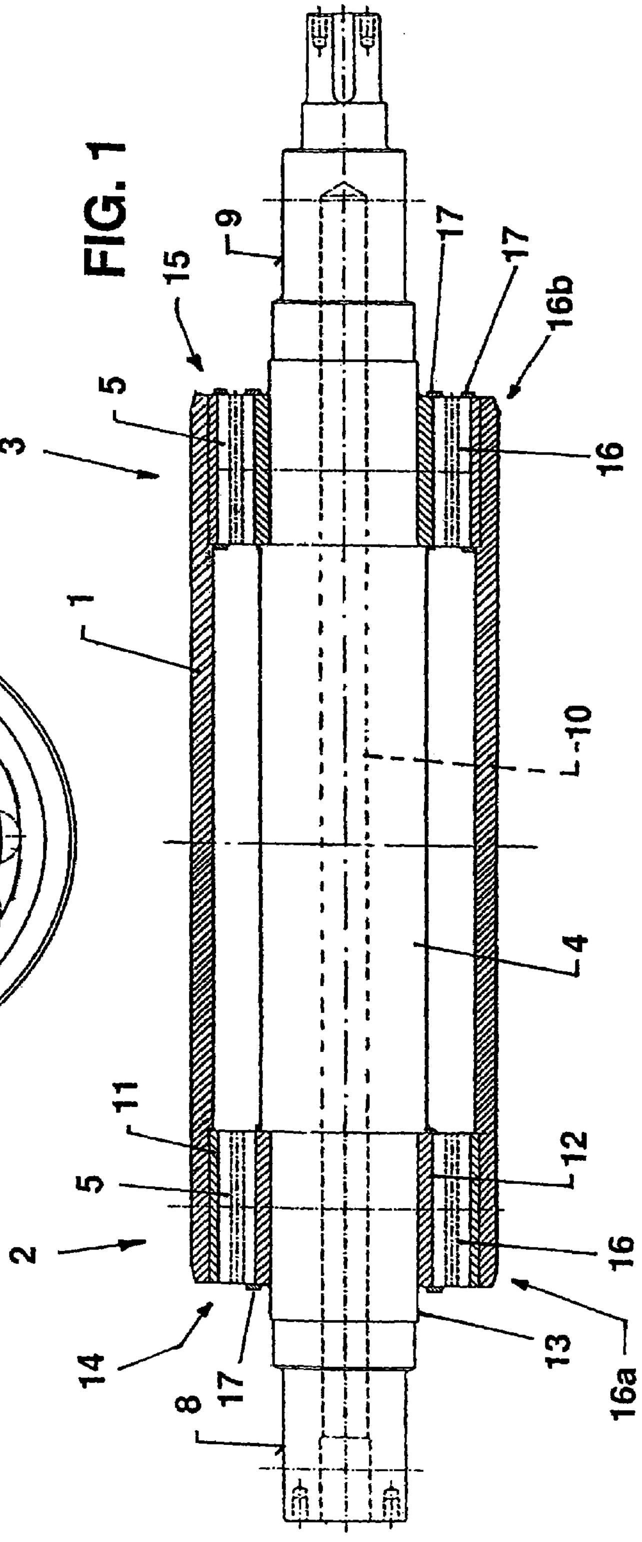
Figure 2A:
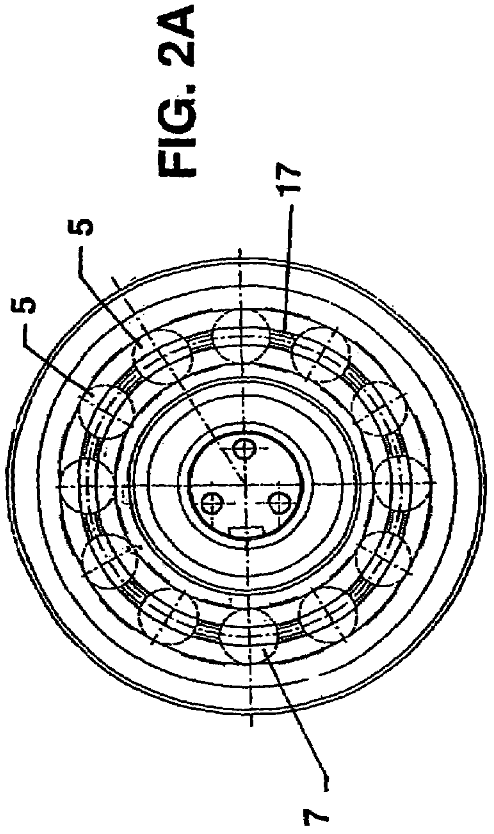
FIG. 2*a* is the associated side view.
Figure 2:
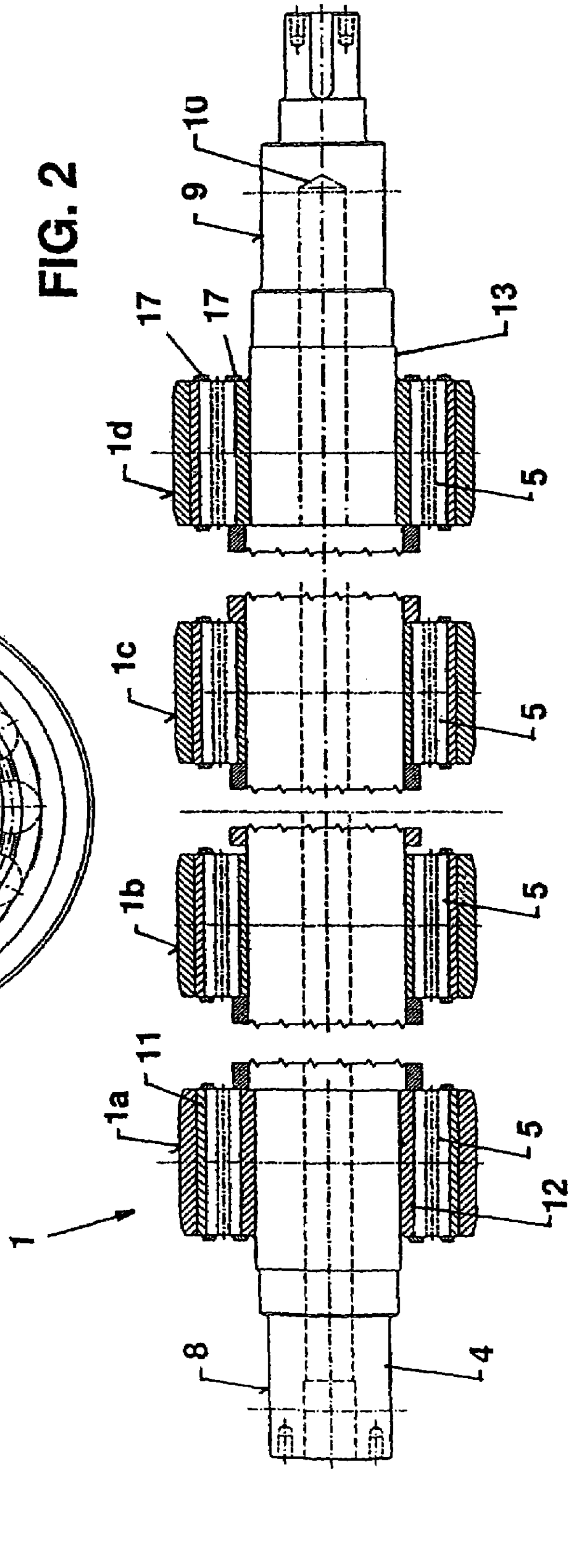
FIG. 2 is an axial longitudinal section through a second embodiment of a roller-conveyor roll with roller casing or shell segments.
Figure 3A:
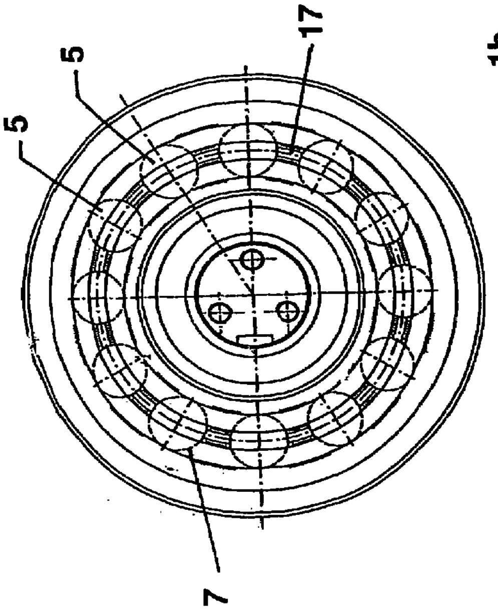
FIG. 3*a* is the associated side view.
Figure 3:
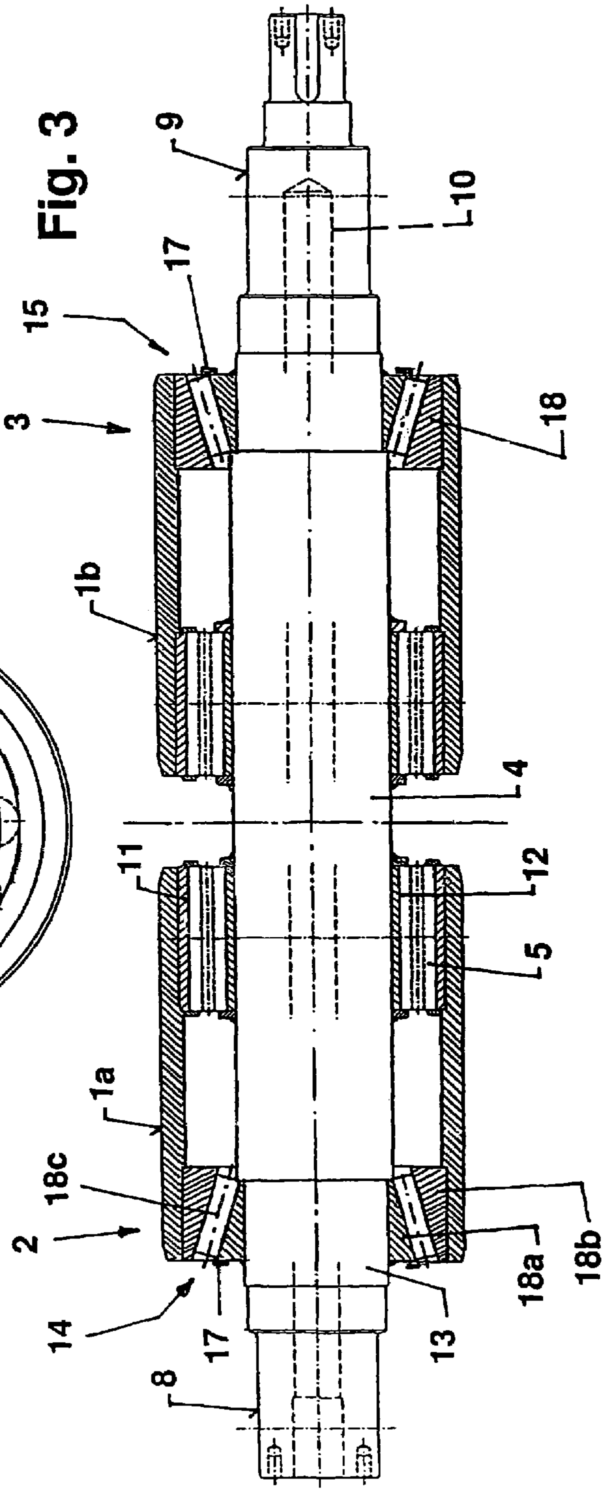
FIG. 3 is an axial longitudinal section through a third embodiment of the roller conveyor roll.

The roller conveyor rolls serve for example for transport of strip material which passes out of a treatment furnace or for the transport of continuous-casting strands, for example. The basic structure encompasses a roller shell or casing 1. The latter is mounted at least at the roll ends 2 and 3 in respective electrical and/or thermal insulators on the roller shaft 4 (FIGS. 1 and 1*a* as a first embodiment).

Figure 4:
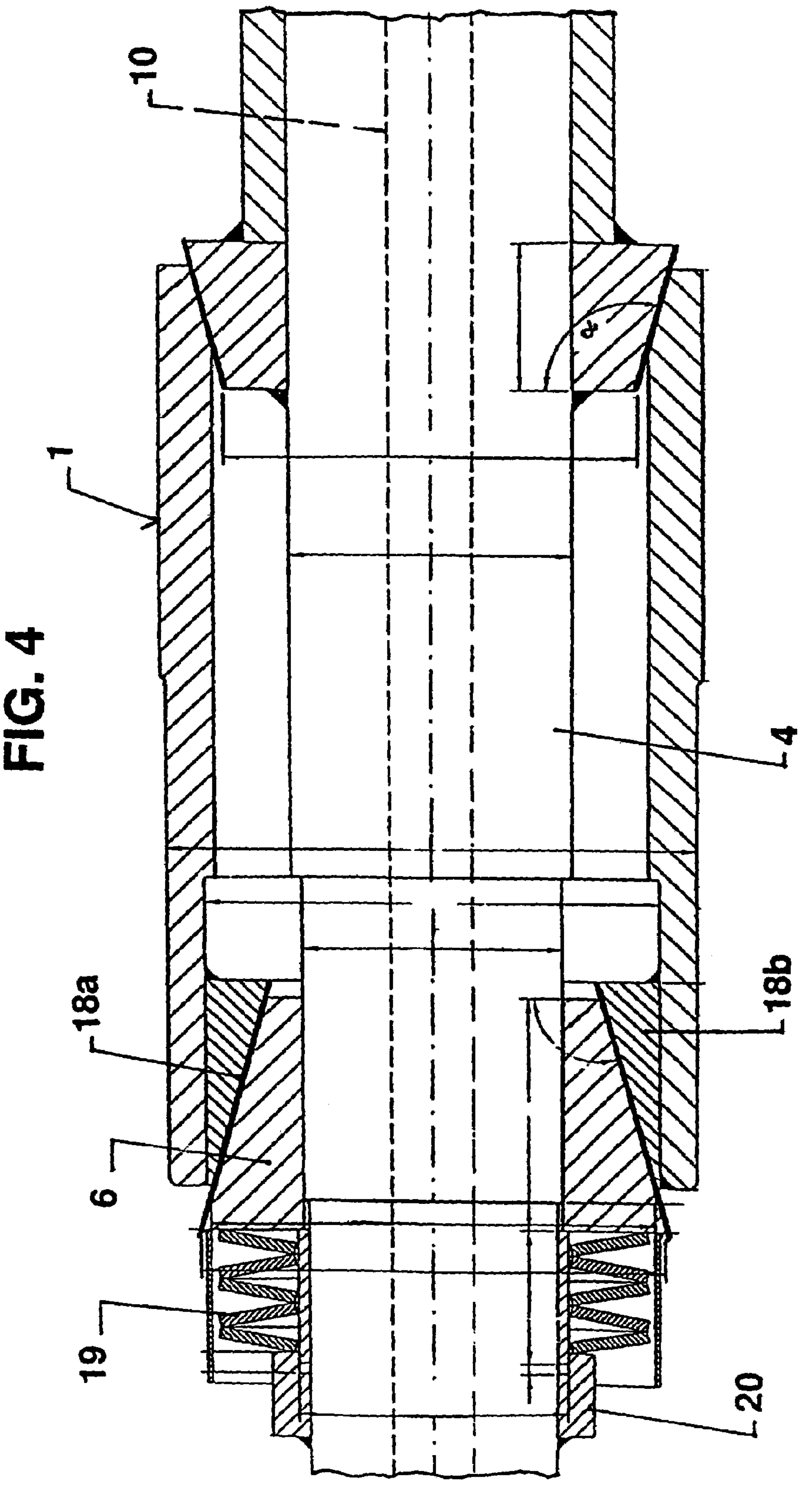
FIG. 4 is an axial longitudinal section through a fourth embodiment of the roller conveyor roll.

The insulation is comprised of individual insulating bodies distributed around the periphery of the roller shaft 4 between the roller shell or casing 1 and the roller shaft 4 at the roll ends 2 and 3 (FIG. 1, 1A, FIG. 2, 2A and FIG. 3, 3A). Alternatively, a one-piece annular insulating body 6 (FIG. 4) can be provided.

The individual insulating bodies 5 distributed around the periphery are comprised of profile rods 7 which have a round, flat, rectangular or polygonal cross section. The profile bars 2 are comprised of ceramic or some other material having an insulating effect.

The roller shaft 4 is equipped with bearing stubs 8 and 9 and is cooled by means of a cooling medium which flows through a core channel 10. The profile rods 7 are secured between outer and inner mounting rings 11 and 12 at shaft steps 13. The rods are axially retained by sheet metal end rings 17 welded onto ends 14 and 15 of the mounting rings 11 and 12 and installed together with the mount 16 formed by the profiled rods 7. These mounts 16 can be formed as a loose mount 16*a* and a fixed mount 16*b* to allow thermal expansion. The insulating bodies 5 center the roll shell 1 on the roller shaft 4 and form simultaneously by form locking and/or force locking a torque transmitting means.

In a second embodiment (FIGS. 2, 2A) the roller shell or casing 1 is subdivided into a plurality of spaced apart roller shell segments 1*a*, 1*b*, 1*c*, 1*d*, etc. arranged upon the roller shaft 4 and which are centered on the roller shaft 4 with respect to the insulating bodies 5 and transfer the drive torque.

According to a third embodiment (FIGS. 3 and 3A) the insulating body 5 is configured as a conical mount 18 of which either the conical inner ring 18*a* or the conical outer ring 18*b* and or the conical rollers 18*c* respectively form the insulating bodies 5.

In the fourth embodiment (FIG. 4) the conically shaped inner ring 18*a* is axially shiftable and is adjustable against the spring force upon the roller shaft 4. The conical inner ring 18*a* is braced on the roller shaft 4 axially by means of dish-disk springs 19 which are seated against a shaft step 20. The ring 18*a* is shiftable relative to the hollow conical outer ring 18*b* fixedly connected with the roll shell or casing 1. The torque in this configuration is transferred by frictional connection to the conical outer ring 18*b*. The insulating material is the ceramic from which the conical outer ring is composed.

Instead of ceramic, glass fiber textiles can be used in a corresponding thickness or layering.

A roller shell or casing segment 1*a*, 1*b*, etc. can at each of the roller ends 2 and/or 3 be mounted in the conical mount 18 somewhat centrally by means of insulating bodies 5 distributed over the periphery.

To limit creep currents over the surface of the insulating body 5*a* dried ambient atmosphere is applied. Such an atmosphere can be obtained for example in the region of a treatment furnace.

We claim:

1. A roller conveyor roll for the transport of furnace-heated metallic strip or a continuously cast steel strand, the roll comprising:

a shaft extending along an axis;

a plurality of axially spaced and aligned tubular shell segments coaxially surrounding the roller shaft and each having a pair of axially spaced ends;

a respective insulating body between the ends of each of the shell segments and angularly fixed to the respective shell segment and to the shaft for transmitting torque between the shaft and the respective shell-segment, the bodies electrically and thermally insulating the shell segments from the shaft; and respective end rings fixed to the shell segments at the shell-segment ends, the insulating bodies being retained between the respective end rings.

2. A roller conveyor roll for the transport of furnace-heated metallic strip or a continuously cast steel strand, the roll comprising:

a shaft extending along an axis;

a plurality of axially spaced and aligned tubular shell segments coaxially surrounding the roller shaft and each having a pair of axially spaced ends; and a respective insulating body between the ends of each of the shell segments and angularly fixed to the respective shell segment and to the shaft for transmitting torque between the shaft and the respective shell-segment, the bodies electrically and thermally insulating the shell segments from the shaft, each body being formed by an array of axially extending rods of thermally and electrically insulating material.

3. A roller conveyor roll for the transport of furnace-heated metallic strip or a continuously cast steel strand, the roll comprising:

a shaft extending along an axis;

a plurality of axially spaced and aligned tubular shell segments coaxially surrounding the roller shaft and each having a pair of axially spaced ends;

a respective sheet-metal end ring welded to each of the ends of the roller shell segments; and a respective axially spaced array of angularly spaced insulating profiled bars between the end rings of each shell segment, each array angularly coupling the respective shell segment to the shaft, the bars electrically and thermally insulating the respective shell segments from the shaft.

* * * * *